(12) United States Patent
Na

(10) Patent No.: US 11,040,711 B2
(45) Date of Patent: Jun. 22, 2021

(54) VEHICLE AND METHOD FOR CONTROLLING THE SAME

(71) Applicants: Hyundai Motor Company, Seoul (KR); Kia Motors Corporation, Seoul (KR)

(72) Inventor: Eun Woo Na, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 15/955,229

(22) Filed: Apr. 17, 2018

(65) Prior Publication Data

US 2019/0176815 A1  Jun. 13, 2019

(30) Foreign Application Priority Data

Dec. 11, 2017  (KR) .................... 10-2017-0169231

(51) Int. Cl.
*B60W 10/20* (2006.01)
*B60W 30/08* (2012.01)
(Continued)

(52) U.S. Cl.
CPC ............ *B60W 30/08* (2013.01); *B60W 10/20* (2013.01); *B60W 10/22* (2013.01); *B60W 30/02* (2013.01);
(Continued)

(58) Field of Classification Search
CPC .. B60W 30/08; B60W 50/0097; B60W 30/02; B60W 10/20; B60W 10/22;
(Continued)

(56) References Cited

U.S. PATENT DOCUMENTS 4,353,568 A * 10/1982 Boyce ..................... B62D 7/22
                                                 280/268
4,371,191 A *  2/1983 Goldberg ................ B60G 3/26
                                                 280/5.501
(Continued)

FOREIGN PATENT DOCUMENTS

JP       2006-306271      * 11/2006
JP       2008-213559 A    *  9/2008
(Continued)

OTHER PUBLICATIONS

"Coordinated Control of Motor-Driven Power Steering Torque Overlay and Differential Braking for Emergency Driving Support;" Jaewoong Choi, Kyongsu Yi, Jeeyoon Suh, Bongchul Ko; IEEE Transactions on Vehicular Technology (vol. 63, Issue: 2, pp. 566-579); Feb. 28, 2014.*

(Continued)

*Primary Examiner* — Khoi H Tran
*Assistant Examiner* — Jorge O Peche
(74) *Attorney, Agent, or Firm* — Mintz Levin Cohn Ferris Glovsky and Popeo, P.C.; Peter F. Corless

(57) ABSTRACT

A vehicle and a method for controlling the same are provided. In particular, the wheels of the vehicle wheels are controlled based on a possibility of collision between the vehicle and an object located in a peripheral region of the vehicle to minimize influence caused by the collision while simultaneously ensuring driving safety. The method includes estimating whether there is a high possibility of collision between the vehicle and the detected object. When the high possibility of collision between the vehicle and the object is estimated the wheels of the vehicle are operated based on a situation of the estimated collision to ensure driving stability of the vehicle during an actual collision between the vehicle and the object.

15 Claims, 16 Drawing Sheets

(51) Int. Cl.
*B60W 10/22* (2006.01)
*B60W 30/02* (2012.01)
*B60W 50/00* (2006.01)

(52) U.S. Cl.
CPC ..... *B60W 50/0097* (2013.01); *B60W 2400/00* (2013.01); *B60W 2420/52* (2013.01); *B60W 2554/00* (2020.02); *B60W 2710/207* (2013.01)

(58) Field of Classification Search
CPC ......... B60W 2554/00; B60W 2420/52; B60W 2710/207; B60W 2400/00; B60W 30/085; B60W 30/12
See application file for complete search history.

(56) References Cited

U.S. PATENT DOCUMENTS

| | | | | |
|---|---|---|---|---|
| 4,941,677 | A * | 7/1990 | Matsumoto | B60G 3/26 280/124.138 |
| 4,957,308 | A * | 9/1990 | Takizawa | B60G 3/20 280/124.138 |
| 5,438,515 | A * | 8/1995 | Miichi | B60G 3/26 701/36 |
| 5,511,817 | A * | 4/1996 | Kasahara | B60G 3/20 267/276 |
| 5,700,025 | A * | 12/1997 | Lee | B60G 3/265 280/124.135 |
| 6,116,627 | A * | 9/2000 | Kawabe | B60G 3/20 280/124.15 |
| 6,256,894 | B1 | 7/2001 | Naruse | G01B 21/26 33/203.12 |
| 6,374,159 | B1 * | 4/2002 | Naruse | G01B 21/26 33/203.15 |
| 6,453,567 | B1 * | 9/2002 | Naruse | G01B 5/255 33/203 |
| 6,564,461 | B1 * | 5/2003 | Naruse | G01B 5/255 33/203 |
| 7,164,117 | B2 * | 1/2007 | Breed | B60R 21/01516 250/208.1 |
| 7,284,769 | B2 * | 10/2007 | Breed | B60R 21/0132 180/282 |
| 10,384,672 | B1 | 8/2019 | Katzourakis | B60W 10/04 |
| 2002/0113396 | A1 * | 8/2002 | Lee | B60G 15/00 280/124.137 |
| 2003/0155753 | A1 * | 8/2003 | Breed | B60R 21/20 280/735 |
| 2004/0036601 | A1 * | 2/2004 | Obradovich | B60W 30/18145 340/540 |
| 2006/0138740 | A1 * | 6/2006 | Nam | B60G 7/008 280/86.756 |
| 2009/0000371 | A1 * | 1/2009 | Hanada | G01M 17/022 73/146 |
| 2009/0212930 | A1 * | 8/2009 | Pfeiffer | B60T 7/22 340/435 |
| 2010/0023213 | A1 * | 1/2010 | Mizuno | B60G 7/003 701/37 |
| 2010/0023214 | A1 * | 1/2010 | Horiguchi | B60C 11/0304 701/40 |
| 2010/0049406 | A1 * | 2/2010 | Wohltmann | B60T 8/1755 701/46 |
| 2011/0251748 | A1 * | 10/2011 | Moran | B60W 30/18118 701/31.4 |
| 2014/0239603 | A1 * | 8/2014 | Balandin | B60G 21/007 280/5.521 |
| 2015/0217618 | A1 * | 8/2015 | Dorrestijn | B62D 7/146 280/5.52 |
| 2016/0185388 | A1 * | 6/2016 | Sim | B60W 10/20 701/41 |
| 2016/0200360 | A1 * | 7/2016 | Moshchuk | B62D 15/0265 701/41 |
| 2017/0144640 | A1 * | 5/2017 | Hattori | B60T 17/226 |
| 2017/0361868 | A1 * | 12/2017 | Guy | B60W 40/02 |
| 2018/0015918 | A1 * | 1/2018 | Bae | B60W 10/184 |
| 2018/0170327 | A1 * | 6/2018 | Lee | B60T 7/22 |
| 2018/0251123 | A1 * | 9/2018 | Sigmar | B60W 20/00 |
| 2019/0179334 | A1 * | 6/2019 | Kim | G08G 1/22 |
| 2020/0064464 | A1 * | 2/2020 | Hiromitsu | G01S 13/50 |
| 2020/0101809 | A1 * | 4/2020 | Bowden | B66F 11/044 |
| 2021/0009193 | A1 * | 1/2021 | Ooba | B62D 5/0463 |

FOREIGN PATENT DOCUMENTS

| | | | |
|---|---|---|---|
| JP | 2009234309 A * | 10/2009 | |
| KR | 10-2006-0057317 | 5/2006 | |
| KR | 10-0699484 B1 | 3/2007 | |
| KR | 10-2007-0035872 | 4/2007 | |
| WO | WO 2015/071756 A2 * | 5/2015 | |

OTHER PUBLICATIONS

"Advances in Automotive Electronics;" Bill Fleming; IEEE Vehicular Technology Magazine (vol. 9, Issue: 4, pp. 4-12); Dec. 1, 2014.*

* cited by examiner (I) NEUTRAL CAMBER (II) NEGATIVE(-) CAMBER (III) POSITIVE(+) CAMBER (I) CAMBER ANGLE CONTROL (II) CHANGE IN LATERAL FORCE

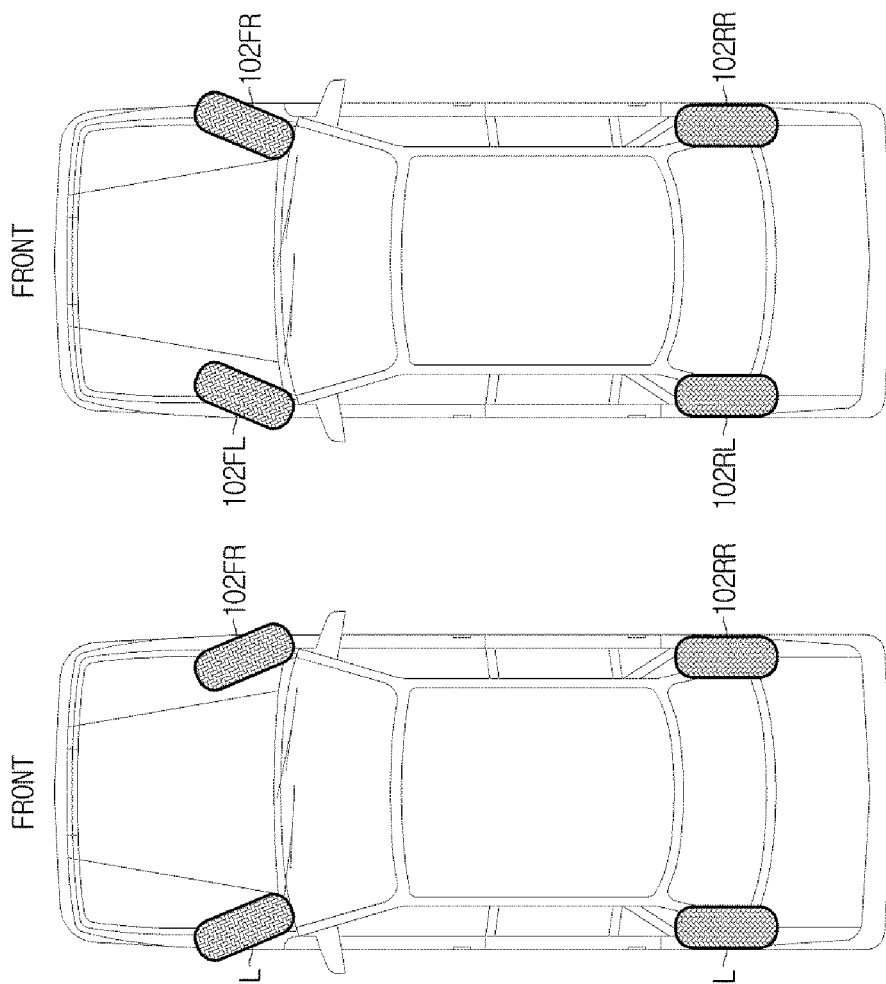

FIG. 10
| COLLISION DIRECTION | CAMBER (FRONT WHEELS & REAR WHEELS) | TOE (REAR WHEELS) | STEERING (FRONT WHEELS) |
|---|---|---|---|
| #1 & #5 | — | 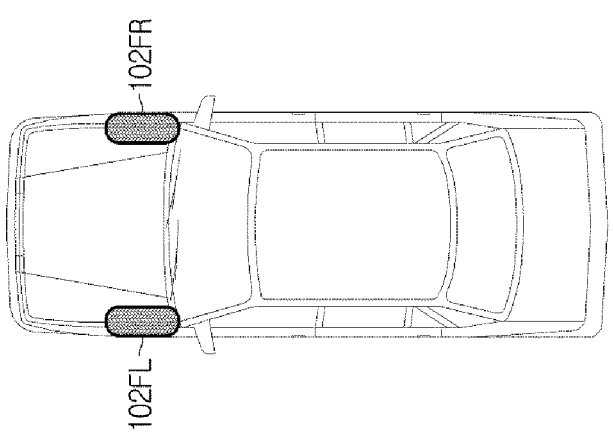 | 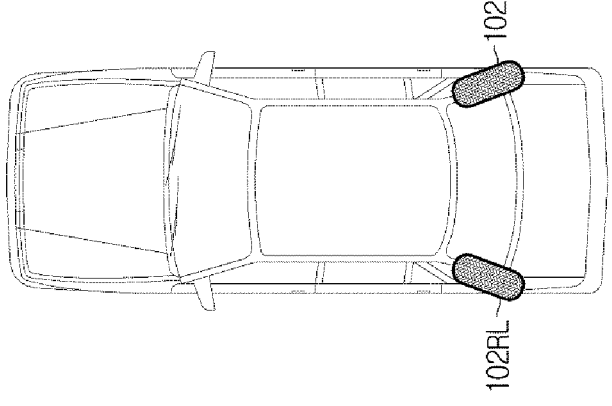 |

| COLLISION DIRECTION | CAMBER (FRONT WHEELS & REAR WHEELS) | TOE (REAR WHEELS) | STEERING (FRONT WHEELS) |
|---|---|---|---|
| #3 | 102FR(+) 102FL(−)<br>102RR(+) 102RL(−) | 102RR<br>102RL | 102FR<br>102FL |

FIG. 13

| COLLISION DIRECTION | CAMBER (FRONT WHEELS & REAR WHEELS) | TOE (REAR WHEELS) | STEERING (FRONT WHEELS) |
|---|---|---|---|
| #4 | 102FR(0) 102FL(0) / 102RL(+) 102RR(−) | 102RL, 102RR | 102FL, 102FR |

| COLLISION DIRECTION | CAMBER (FRONT WHEELS & REAR WHEELS) | TOE (REAR WHEELS) | STEERING (FRONT WHEELS) |
|---|---|---|---|
| #7 | 102FR(−) 102FL(+)<br>102RL(+) 102RR(−) | 102RL — 102RR | 102FL — 102FR |

VEHICLE AND METHOD FOR CONTROLLING THE SAME

CROSS-REFERENCE TO RELATED APPLICATION

This application claims the benefit of Korean Patent Application No. 10-2017-0169231, filed on Dec. 11, 2017, the disclosure of which is incorporated herein by reference.

BACKGROUND

1. Field of the Disclosure

The present disclosure relates to a vehicle, and more particularly, to a technology for controlling vehicle wheels in consideration of a potential vehicle collision.

2. Description of the Related Art

Generally, a conventional countermeasure against vehicle collision detects a possibility of a collision by detecting a leading vehicle traveling ahead of a subject vehicle using a radar, and outputs a collision warning sound based on the detected result. To more actively cope with the possibility of collision with the leading vehicle, the conventional countermeasure against vehicle collision may also perform braking control, seat belt control, or the like. However, a collision warning sound, braking control, and seat belt control are merely passive ways respond to a potential vehicle collision before the collision occurs, and may be unable to provide sufficient driving stability of a vehicle and high safety of a driver and passengers within the vehicle.

SUMMARY

Therefore, an aspect of the present disclosure provides a technology for controlling vehicle wheels in consideration of the possibility of a collision between a host or subject vehicle and a peripheral object, thus minimizing influence caused by such a collision while simultaneously ensuring vehicle driving safety. Additional aspects of the invention will be set forth in part in the description which follows and, in part, will be obvious from the description, or may be learned by practice of the invention.

In accordance with an aspect of the present disclosure, a method for controlling a vehicle may include: estimating whether there is a high possibility of collision between a vehicle and an object located in a peripheral region of the vehicle; and when the high possibility of collision between the vehicle and the object is estimated, controlling wheels of the vehicle based on a situation of the estimated collision, and thus ensuring driving stability of the vehicle during an actual collision between the vehicle and the object.

The estimating of the possibility of collision between the vehicle and the object may include performing the collision estimation using at least one of a relative speed and a relative distance between the vehicle and the object. The method may further include estimating the possibility of collision between the vehicle and the object based on a relatively higher value from among a collision estimation index calculated based on the relative speed and a collision estimation index calculated using the relative distance.

The situation of the estimated collision may indicate a collision estimation direction in which the object would collide with the vehicle. The estimated collision situation may further include collision estimation strength at which the object would collide with the vehicle. The controlling of the wheels may include adjusting at least one of a camber, toe, and steering of each of the wheels. The camber control of each of the wheels may include variably adjusting a camber angle of each wheel based on the collision estimation strength of the object. The ensuring of the driving stability may include preventing lane departure of the vehicle thus ensuring linear traveling characteristics of the vehicle.

In accordance with another aspect of the present disclosure, a vehicle may include a sensor configured to detect an object located in a peripheral region of the vehicle; and a controller configured to estimate whether there is a high possibility of collision between the vehicle and the detected object based on a detection result of the sensor, when the high possibility of collision between the vehicle and the object is estimated, control wheels of the vehicle based on a situation of the estimated collision, and thus ensure driving stability of the vehicle during an actual collision between the vehicle and the object.

The estimation of a collision between the vehicle and the object may be achieved using at least one of a relative speed and a relative distance between the vehicle and the object. The controller may be configured to estimate the possibility of a collision between the vehicle and the object based on a relatively higher value from among a collision estimation index calculated based on the relative speed and a collision estimation index calculated using the relative distance. The estimated collision situation may indicate a collision estimation direction in which the object would collide with the vehicle. The estimated collision situation may further include collision estimation strength at which the object would collide with the vehicle.

Additionally, the control of the wheels may be achieved by adjusting at least one of camber, toe, and steering of each of the wheels. The camber control of each of the wheels may include variably adjusting a camber angle of each wheel based on a collision estimation strength of the object. The ensuring of the driving stability may include preventing lane departure of the vehicle thus ensuring linear traveling characteristics of the vehicle.

In accordance with another aspect of the present disclosure, a method for controlling a vehicle may include detecting a relative speed and relative distance between a vehicle and an object located in a peripheral region of the vehicle; estimating whether there is a high possibility of a collision between the vehicle and the object based on the detection result; and when the high possibility of a collision between the vehicle and the object is estimated, adjusting at least one of camber, toe, and steering of each wheel of the vehicle based on a direction of the estimated collision and strength of the estimated collision, and thus ensuring driving stability of the vehicle during an actual collision between the vehicle and the object.

BRIEF DESCRIPTION OF THE DRAWINGS

These and/or other aspects of the invention will become apparent and more readily appreciated from the following description of the exemplary embodiments, taken in conjunction with the accompanying drawings of which:

FIGS. 5A-5C are views illustrating front-wheel steering of a vehicle according to an exemplary embodiment of the present disclosure;

FIG. 10 is a view illustrating a method for controlling vehicle wheels under a high possibility of collision in a front or rear part of the vehicle according to an exemplary embodiment of the present disclosure;

FIG. 11 is a view illustrating a method for controlling vehicle wheels under a high possibility of collision in a front part of a right side of the vehicle according to an exemplary embodiment of the present disclosure;

FIG. 12 is a view illustrating a method for controlling vehicle wheels under a high possibility of collision in a center part of a right side of the vehicle according to an exemplary embodiment of the present disclosure;

FIG. 13 is a view illustrating a method for controlling vehicle wheels under a high possibility of collision in a rear part of a right side of the vehicle according to an exemplary embodiment of the present disclosure;

FIG. 14 is a view illustrating a method for controlling vehicle wheels under a high possibility of collision in a front part of a left side of the vehicle according to an exemplary embodiment of the present disclosure;

FIG. 15 is a view illustrating a method for controlling vehicle wheels under a high possibility of collision in a center part of a left side of the vehicle according to an exemplary embodiment of the present disclosure.

DETAILED DESCRIPTION

Figure 1:
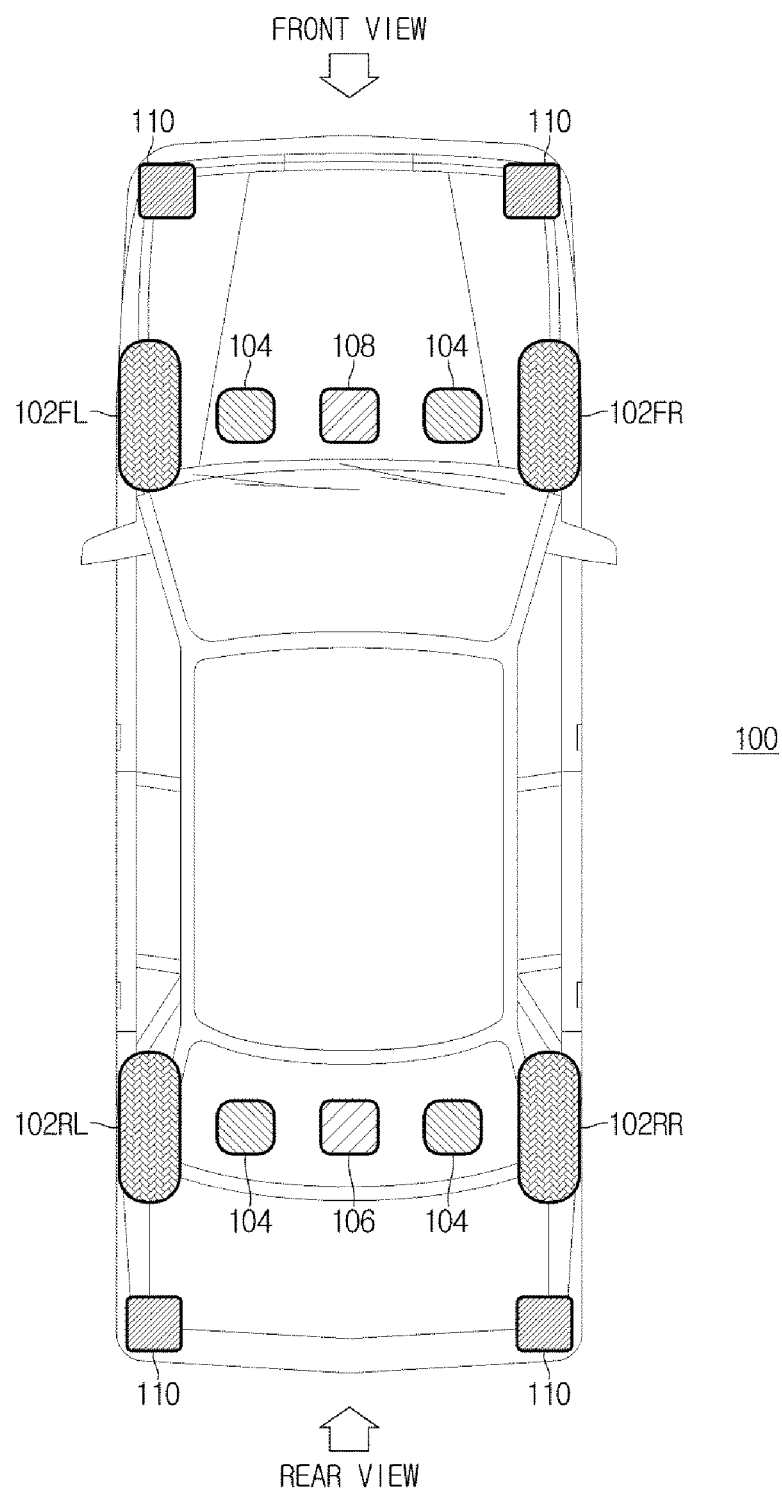
FIG. 1 is a view illustrating a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present disclosure, examples of which are illustrated in the accompanying drawings, wherein like reference numerals refer to like elements throughout.

FIG. 1 is a view illustrating a vehicle 100 according to an exemplary embodiment of the present disclosure. Referring to FIG. 1, the vehicle 100 may include wheels 102, at least one camber drive portion 104, a toe drive portion 106, a steering drive portion 108, and at least one radar 110.

In particular, the wheels 102 may include two front wheels 102FL and 102FR and two rear wheels 102RL and 102RR. The wheels 102 may be classified into a front left wheel 102FL, a front right wheel 102FR, a rear left wheel 102RL, and a rear right wheel 102RR. For convenience of description and better understanding of the present disclosure, the entirety of four wheels 102FL, 1021R, 102RL, and 102RR will hereinafter be referred to as a reference number 102. The camber drive portion 104 may be provided to each of four wheels 102. By operation of four independent camber drive portions 104, camber angles of the four wheels 102 may be adjusted independently. The adjustment of the camber angles will hereinafter be described with reference to FIG. 2.

The toe drive portion 106 may also be referred to as a rear wheel steering (RWS) portion. The toe drive portion 106 may be a device configured to adjust a toe angle of rear wheels 102RL and 102RR. The toe drive portion 106 may be configured to adjust toe angles of the rear wheels 102RL and 102RR based on a driving state (e.g., vehicle speed or the like) of the vehicle 100, resulting in increased driving stability and safety of the vehicle 100. The adjustment of tow angles of wheels will hereinafter be described with reference to FIG. 3. The steering drive portion 108 may be a Motor Driven Power Steering (MDPS) device. In other words, the steering drive portion 108 may be configured to adjust rotation shaft directions of the front wheels 102FL and 1021R in response to steering wheel manipulation of a user, thereby changing a traveling direction of the vehicle 100. The steering drive portion 108 may be configured to adjust the rotation shaft directions of the front wheels 102FL and 102FR using drive force of a motor. The MDPS device will hereinafter be described with reference to FIG. 4.

The radar 110 may be a sensor configured to detect an object (e.g., a peripheral vehicle) located in a peripheral region of the vehicle 100. For example, the vehicle 100 may be configured to detect the presence, position, direction, and relative speed of objects located in a peripheral region of the vehicle 100 using the radar 110. The object may be a peripheral vehicle or geographic features such as a building, structure, etc. The vehicle 100 may include four radars 110. In other words, the radars 110 may be mounted to each of a left side and a right side of a front part of the vehicle 100. The radars 110 may also be mounted to each of a left side and a right side of a rear part of the vehicle 100.

Figure 2A:
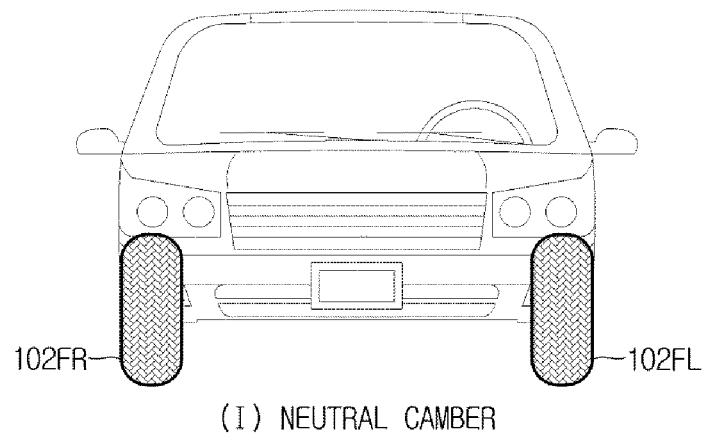
FIGS. 2A-2C are views illustrating camber angle control of a vehicle according to an exemplary embodiment of the present disclosure.
Figure 2B:
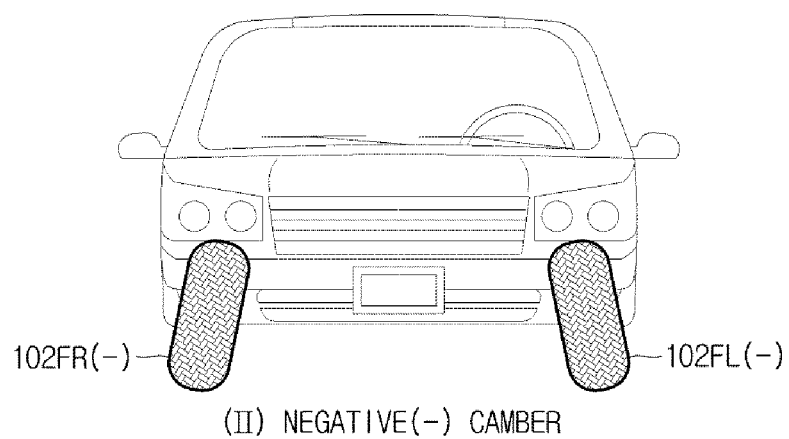
Figure 2C:
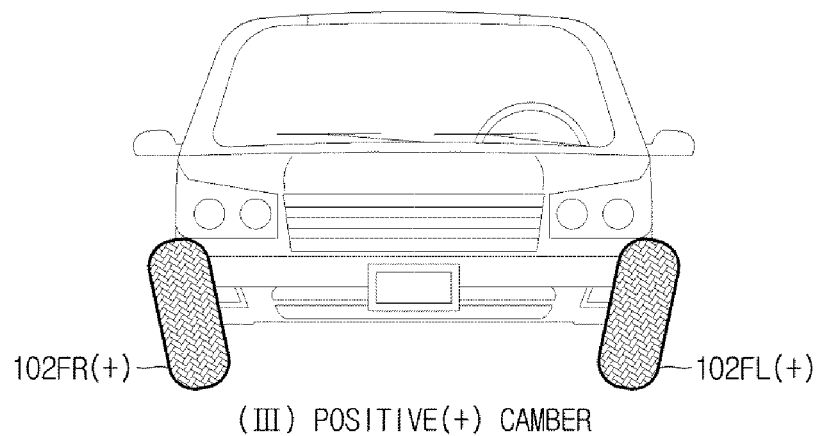

FIGS. 2A-2C are views illustrating camber angle control of a vehicle according to an exemplary embodiment of the present disclosure. Although FIG. 2 exemplarily illustrates only front wheels 102FL and 1021R for convenience of description, camber angle control may also be applied to rear wheels in the same manner as in the front wheels 102FL and 102FR.

Referring to FIGS. 2A-2C, the camber drive portion 104 of the vehicle 100 may be configured to adjust camber angles of the wheels 102. From the front view of the vehicle 100, the camber angle may denote an angle of each wheel 102 with respect to a ground surface. A method for adjusting camber angles of the wheels 102 may be classified into a neutral camber control (I), negative camber control (II), and positive camber control (III).

The camber angle may be freely changed within a predetermined range. As shown in FIG. 2A, the neutral camber (I) may denote vertically upright wheels 102FL and 102FR. As shown in FIG. 2B, the negative camber (II) may indicate that wheels 102FL and 102FR are tilted in a trapezoid shape. As shown in FIG. 2C, the positive camber (III) may indicate that wheels 102FL and 1021R are tilted in an inverted trapezoid shape from the front view of the vehicle 100.

Figure 3A:
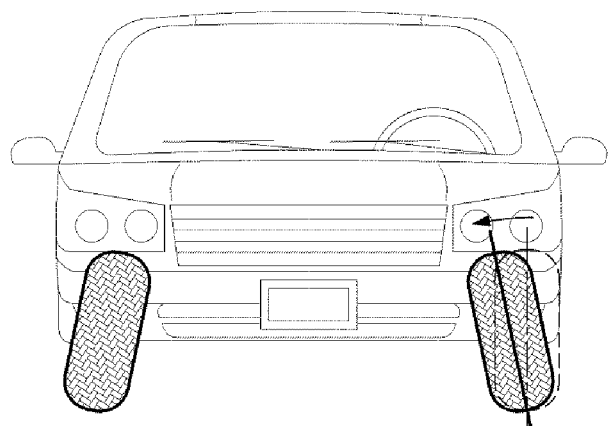
FIGS. 3A-3B are views illustrating a change in lateral force based on camber angle control of a vehicle according to an exemplary embodiment of the present disclosure.
Figure 3B:
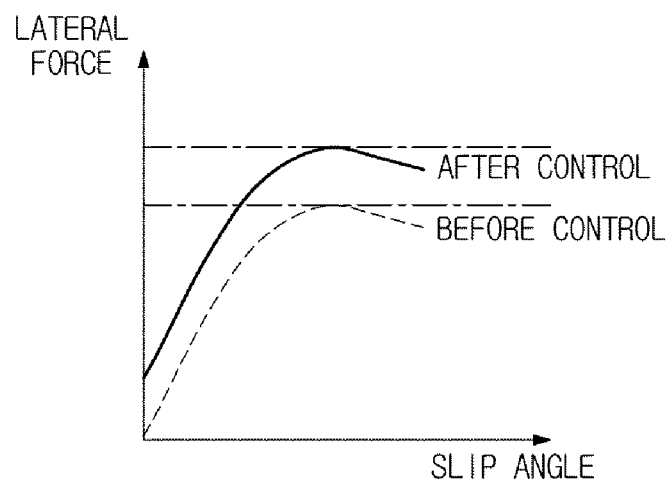

FIGS. 3A-3B are views illustrating a change in lateral force based on camber angle control of a vehicle according to an exemplary embodiment of the present disclosure. Referring to FIGS. 3A-3B, the camber angle of each wheel 102 may cause a change in lateral force of the vehicle 100. As shown in FIG. 3A, lateral force of a slip angle of the vehicle 100 when the wheel 102FL is at the negative camber (denoted by solid lines) is greater than lateral force of a slip angle of the vehicle 100 when the wheel 102FL is at the neutral camber (denoted by dotted lines), resulting in increased agility of the vehicle 100. In other words, lateral slippage of the vehicle 100 at the negative camber may be less than lateral slippage of the vehicle 100 at the neutral or positive camber. Therefore, lateral displacement (i.e., slippage caused by external force) of the vehicle 100 receiving lateral external force (e.g., impact) from the vehicle 100 when the vehicle is at the negative camber is less than lateral displacement of the vehicle at the neutral or positive camber. Accordingly, the vehicle 100 may acquire higher linearity in traveling at the negative camber.

Figure 4A:
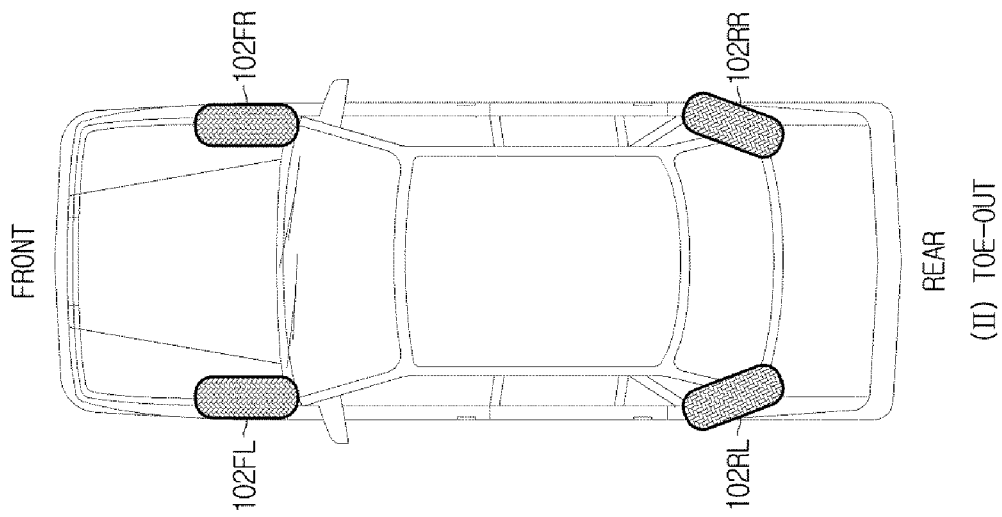
FIGS. 4A-4B are views illustrating rear-wheel toe angle control of a vehicle according to an exemplary embodiment of the present disclosure.
Figure 4B:
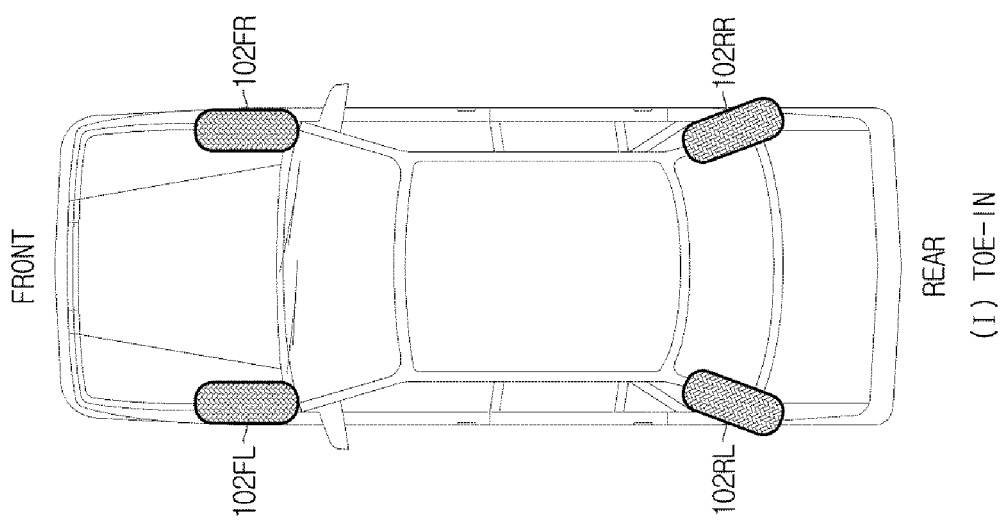

FIGS. 4A-4B are views illustrating rear-wheel toe angle control of a vehicle according to an exemplary embodiment of the present disclosure. Referring to FIGS. 4A-4B, a front end of each wheel 102RL or 102RR with respect to the traveling direction from the top view of the vehicle 100 will hereinafter be referred to as a toe. As shown in FIG. 4A, a state in which front ends of the wheels 102RL and 102RR are arranged inward of a vehicle body will hereinafter be referred to as a toe-in status, and a state in which front ends of the wheels 102RL and 102RR are arranged outward of the vehicle body will hereinafter be referred to as a toe-out status. Additionally, road surface resistance may be gradually increased in proportion to a toe-in angle and a toe-out angle. For reference, the toe-in state with an appropriate angle may increase linear traveling stability of the vehicle.

FIGS. 5A-5C are views illustrating front-wheel steering of the vehicle according to an exemplary embodiment of the present disclosure. Referring to FIGS. 5A-5C, steering of front wheels 102FL and 102FR of the vehicle 100 is the same as general steering. In other words, FIG. 5A illustrates the vehicle 100 in which front wheels 102FL and 102FR are arranged in parallel to a longitudinal shaft of the vehicle 100 thus allowing the vehicle 100 to be driven substantially linearly (e.g., straight). FIG. 5B illustrates the vehicle 100 in which front wheels 102FL and 102FR are steered to the left thus allowing the vehicle 100 to turn left. FIG. 5C illustrates the vehicle 100 in which front wheels 102FL and 102FR are steered to the right to allow the vehicle 100 to turn right.

Figure 6:
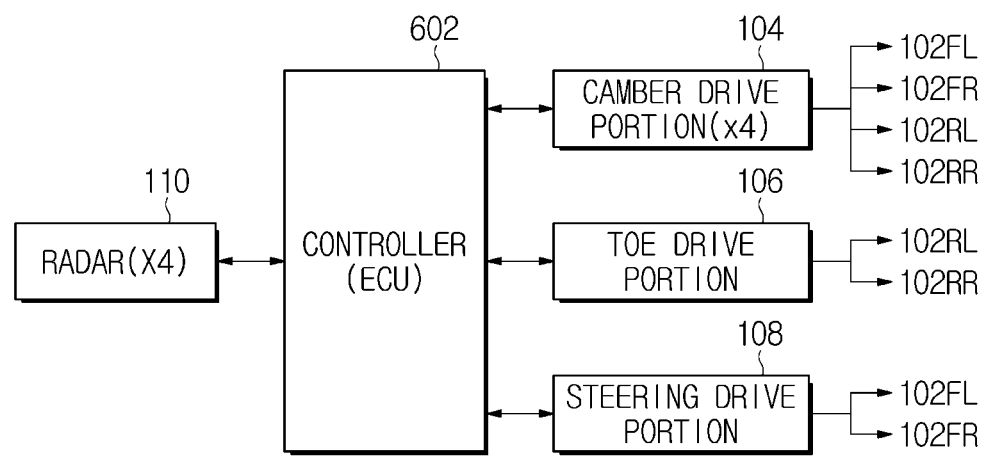
FIG. 6 is a block diagram illustrating a control system of a vehicle according to an exemplary embodiment of the present disclosure.

FIG. 6 is a block diagram illustrating a control system of the vehicle according to an exemplary embodiment of the present disclosure. Referring to FIG. 6, four radars 110 may be connected to an input terminal of the controller 602 to allow communication between the four radars 110. The camber drive portion 104, the toe drive portion 106, and the steering drive portion 108 may be connected to an output terminal of the controller 602 to allow communication between the camber drive portion 104, the toe drive portion 106, and the steering drive portion 108.

In particular, the controller 602 may be an electronic control unit (ECU). The controller 602 may be configured to operate the vehicle 100. For example, the controller 602 of the vehicle 100 may be configured to estimate whether the vehicle 100 (hereinafter referred to as a host or subject vehicle) will collide with peripheral objects based on the detection result received from the four radars 110. In other words, the controller 602 may be configured to detect a likelihood or risk of collision with a surrounding object or vehicle. When a high possibility of collision between the host vehicle 100 and the peripheral objects is detected, wheels of the host vehicle 100 may be operated by the camber drive portion 104, the toe drive portion 106, and the steering drive portion 108 to reduce the affect of the host vehicle 100 by external force to be generated by collision. A high possibility of collision may be determined as the host vehicle being within a particular distance to the surrounding objects, traveling at a speed that is a greater than surrounding objects, or the like. The claimed disclosure is not limited thereto and other factors may be used to determine a high collision risk. A vehicle control method for coping with the high possibility of such collision using the controller 602 will hereinafter be described with reference to FIGS. 7 to 16.

Figure 7:
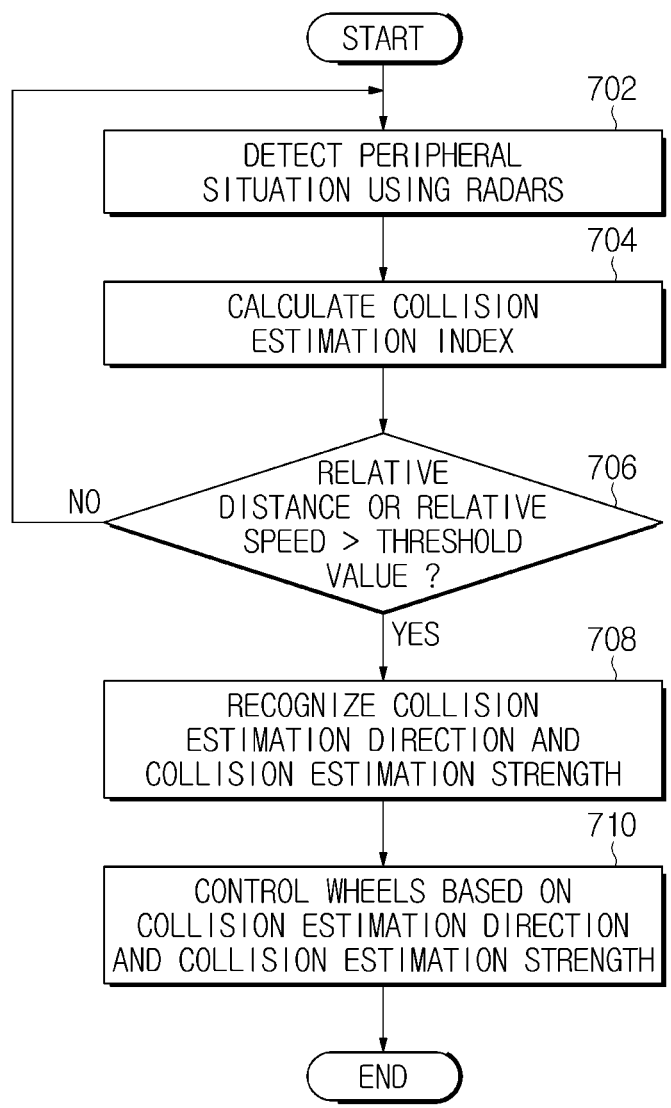
FIG. 7 is a flowchart illustrating a method for controlling a vehicle according to an exemplary embodiment of the present disclosure.

FIG. 7 is a flowchart illustrating a method for controlling the vehicle according to an exemplary embodiment of the present disclosure. In particular, FIG. 7 is a flowchart illustrating a method for allowing the controller 602 to respond to a detection of a high collision risk of the vehicle 100. The controller 602 may be configured to detect a peripheral situation (e.g., a surrounding environment) of the vehicle 100 using four radars 110 (702). The controller 602 may be configured to detect various types of information of peripheral or surrounding objects of the vehicle 100 using the radars 110, for example, presence, position, direction, and relative speed of the peripheral objects. In particular, the object may be a neighboring vehicle or geographic features such as a building, structure, etc., but is not limited thereto.

When at least one object (e.g., a peripheral vehicle) is detected in a peripheral region of the host vehicle 100, the controller 602 may be configured to calculate a collision estimation index between the host vehicle 100 and the object based on a relative distance, relative speed, etc. between the host vehicle 100 and the object (704). A method for calculating the collision estimation index will hereinafter be described with reference to FIG. 8.

Figure 8A:
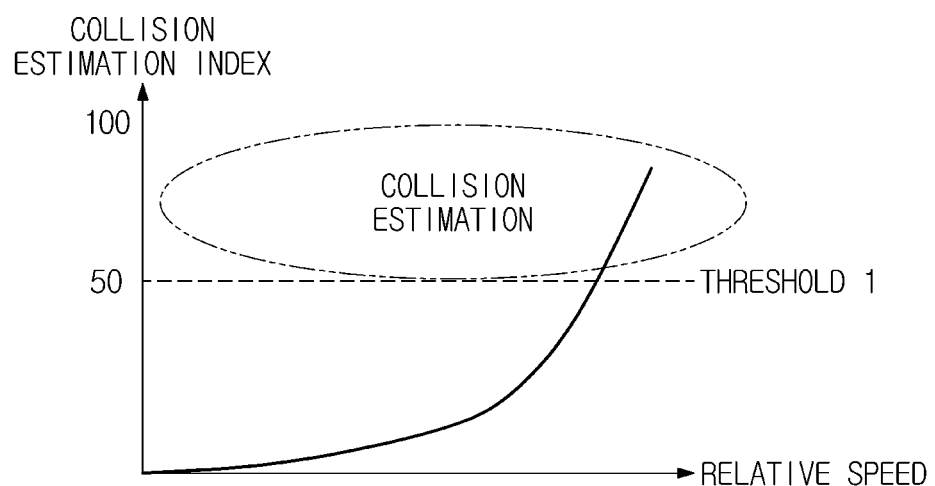
FIGS. 8A-8B are conceptual diagrams illustrating methods for calculating a collision estimation index of a vehicle according to an exemplary embodiment of the present disclosure.
Figure 8B:
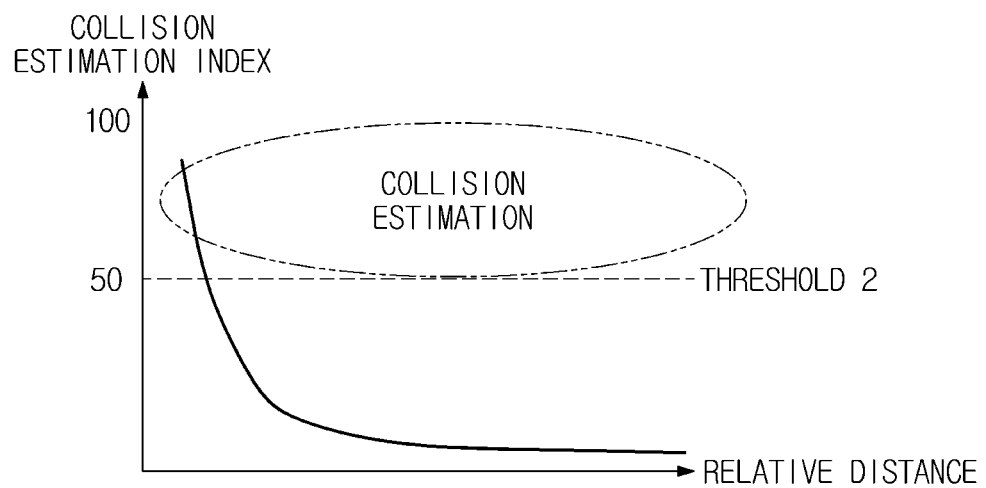

FIGS. 8A-8B are conceptual diagrams illustrating methods for calculating a collision estimation index of a vehicle according to an exemplary embodiment of the present disclosure. Referring to FIGS. 8A and 8B, the controller 602 may be configured to calculate the collision estimation index using the relative speed and relative distance between the host vehicle and the detected object. In consideration of various situations encountered in actual vehicle driving, the controller 602 may be configured to accumulate collision possibility data based on the relative speed and relative speed through experimentations, and may then be configured to calculate a threshold value capable of recognizing the possibility of collision by analyzing the accumulated data. The controller 602 may be configured to analyze the detection result of the radars 110, compare the analyzed result with the threshold value, and thus calculate the collision estimation index based on the comparison result. Further, the controller 602 may be configured to recognize the final collision possibility based on a higher one of one collision estimation index based on the relative speed and the other collision estimation index based on the relative distance.

Referring back to FIG. 7, the controller 602 may be configured to determine whether the relative distance or relative speed associated with the detected object is greater than a threshold distance or threshold speed, and may thus be configured to determine the possibility of collision between the host vehicle 100 and the detected object based on the detection result (706). As shown in FIG. 8A, when the relative speed between the host vehicle 100 and the detected object is greater than a first threshold value (Threshold 1), the controller 602 may be configured to determine a high possibility of collision between the host vehicle 100 and the object. Similarly, as shown in FIG. 8B, when the relative distance between the host vehicle 100 and the detected object is greater than a second threshold value (Threshold 2), the controller 602 may be configured to determine a high possibility of collision between the host vehicle 100 and the detected object. When the collision estimation index based on the relative distance is different from the collision estimation index based on the relative speed, the controller 602 may be configured to determine the possibility of collision based on a higher one of one collision estimation index based on the relative speed and the other collision estimation index based on the relative distance.

When a high possibility of collision is estimated due to the collision estimation index being greater than the threshold value ('Yes' in 706), the controller 602 may be configured to determine the collision estimated direction and the collision estimated strength (708). The controller 602 may be configured to determine the collision estimated direction and the collision estimated strength based on the relative distance and relative speed detected by the four radars 110 mounted on the vehicle 100.

Figure 9:
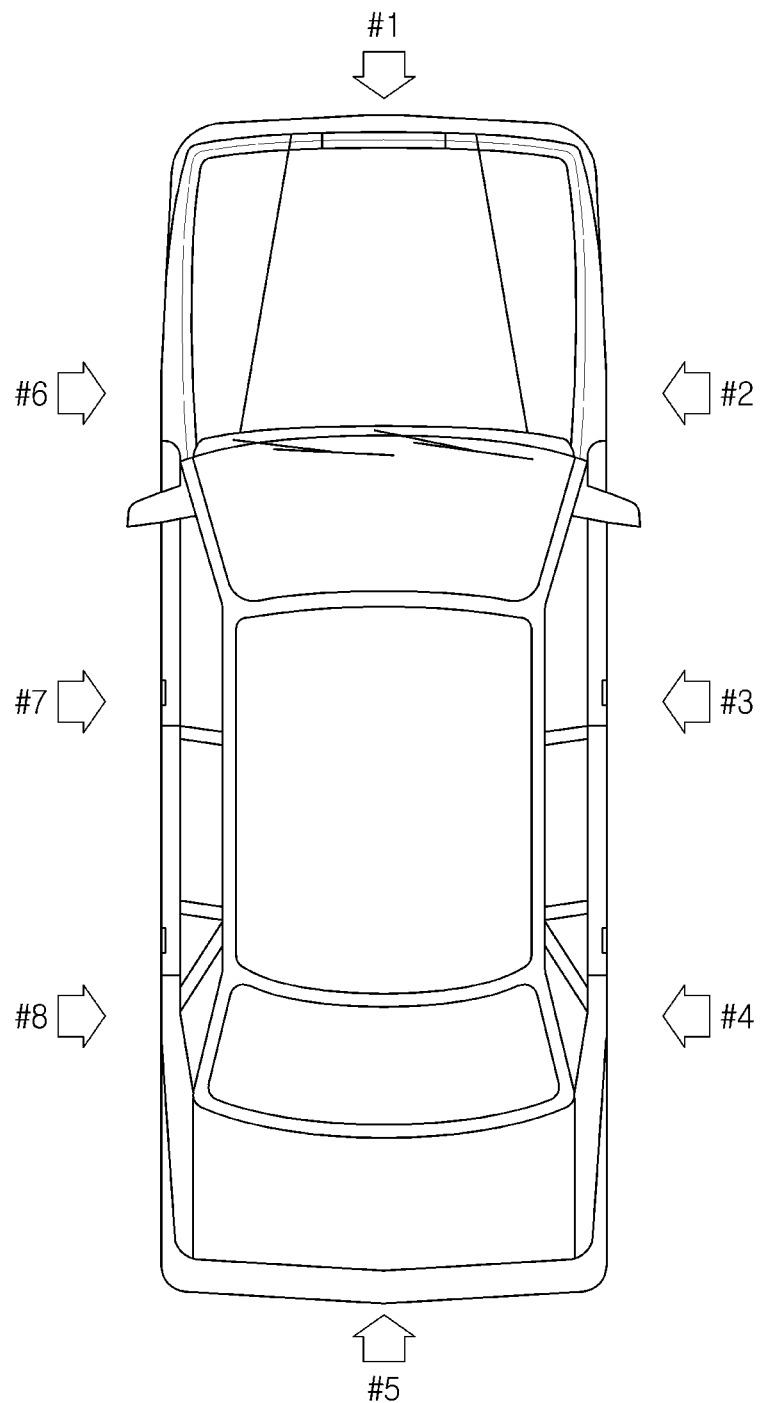
FIG. 9 is a view illustrating an example of a collision direction capable of being recognized by the result obtained by four radars mounted to the vehicle according to an exemplary embodiment of the present disclosure.

FIG. 9 is a view illustrating an example of collision direction capable of being recognized by the result obtained by four radars mounted to the vehicle according to an exemplary embodiment of the present disclosure. Referring to FIG. 9, the controller 602 may be configured to analyze the detection result of the radars 110, and estimate a high possibility of collision between the host vehicle 100 and the object in any one of eight directions (#1-#8) covering forward, right-lateral, backward, and left-lateral directions of the vehicle 100 based on the analyzed result. The number of collision estimation directions may be less or greater than the 8 directions shown in FIG. 9.

Referring back to FIG. 7, the controller 602 may be configured to operate wheels based on the collision estimated direction (710). When there is a high possibility that the peripheral vehicle will collide with the host vehicle 100 in any one of various directions shown in FIG. 9, the controller 602 may be configured to operate vehicle wheels, to minimize the influence of actual collision in the collision estimated direction, and at the same time may ensure an improved driving stability. The above-mentioned wheel control of the controller 602 is shown in FIGS. 10 to 16.

In FIGS. 10 to 16, wheel control of the controller 602 may be classified into camber angle control for four wheels 102, toe angle control for two rear wheels 102RL and 102RR, and steering control for two front wheels 102FL and 102FR. In other words, the controller 602 may be configured to adjust the angle of the wheels. FIG. 10 is a view illustrating a method for controlling vehicle wheels under a high possibility of collision in a front or rear part of the vehicle, as shown in #1 of FIG. 9 or #5 of FIG. 9. Referring to FIG. 10, when there is a high possibility that the host vehicle 100 will collide with the object in the forward direction (#1) or in the backward direction (#5), the controller 602 may perform the following wheel control method.

In particular, the controller 602 may not perform camber angle control for front wheels (102FL, 102FR) and rear wheels (102RL, 102RR) and may be configured to maintain the camber angles of the front wheels. Additionally, the controller 602 may be configured to perform toe control for rear wheels 102RL and 102RR and toe-in control for two rear wheels 102RL and 102RR. The controller 602 may also be configured to perform steering control for linearly arranging front wheels 102FL and 102FR.

When the host vehicle 100 actually collides with the object in the forward direction (#1) or the backward direction (#5), the vehicle 100 may travel in a forward or backward direction due to the external force applied to the forward or backward direction thereof. When there is a high possibility that the host vehicle 100 will collide with the object in the forward direction (#1) or the backward direction (#5), the controller 602 may be configured to perform toe-in control for rear wheels 102RL and 102RR, to reduce a traveling distance generated in the forward or backward direction during actual collision. In addition, straight arrangement steering control for front wheels 102FL and 102FR (e.g., maintaining the wheels such that the vehicle travels linearly) may allow the host vehicle 100 to travel straight during actual collision between the host vehicle 100 and the object located in the forward direction (#1) or the backward direction (#5) of the host vehicle 100, thereby preventing lane departure of the host vehicle 100. By the above-mentioned control, the controller 602 may minimize the influence of actual collision, while simultaneously ensuring vehicle driving stability.

Figure 11:
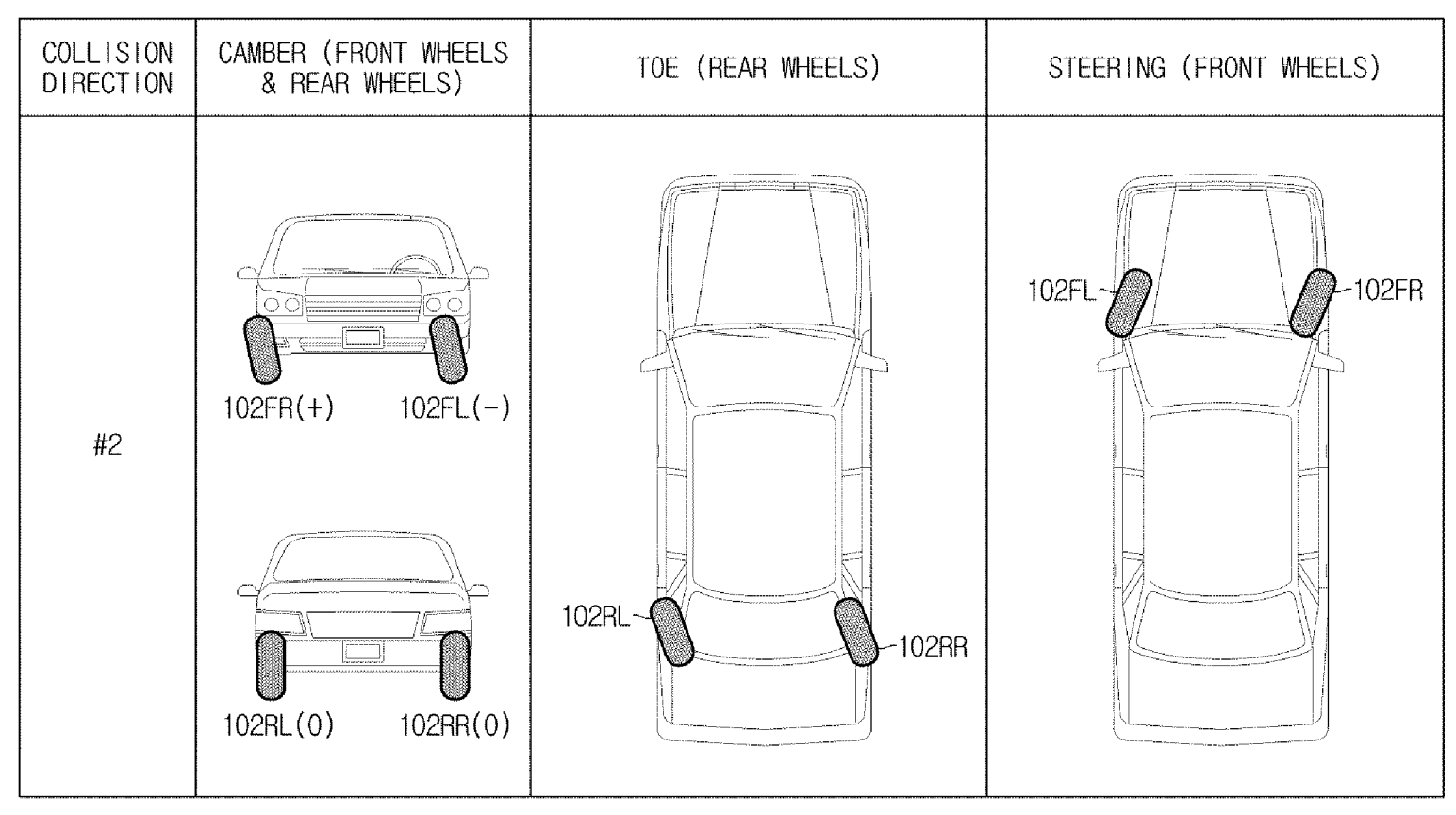

FIG. 11 is a view illustrating a method for controlling vehicle wheels under a high possibility of collision in a front part of a right side of the vehicle, as shown in #2 of FIG. 9. Referring to FIG. 11, when there is a high possibility of collision in the front part (#2) of the right side of the vehicle 100, the controller 602 may be configured to perform the following wheel control. In particular, the controller 602 may be configured to perform camber angle control for only front wheels 102FL and 102FR. The controller 602 may be configured to perform negative (−) camber control for the front left wheel 102FL, and perform positive (+) camber control for the front right wheel 1021R. Particularly, the controller 602 may be configured to perform toe control for rear wheels 102RL and 102RR. Additionally, the controller 602 may be configured to perform toe-out control for the rear left wheel 102RL and toe-in control for rear wheels 102R. The controller 602 may be configured to perform right steering control for the front wheels 102FL and 102FR.

During actual collision between the vehicle 100 and the object located in the front right direction (#2) of the vehicle 100, the vehicle 100 may lose linear traveling characteristics due to external force applied to the front right side of the vehicle 100 and thus, the vehicle 100 may be pushed to the left or may be forced to the left, resulting in lane departure of the vehicle 100. When there is a high possibility that the vehicle 100 will collide with the object in the front right direction (#2) of the vehicle 100 as described above, the controller 602 may allow the object to contact the protruding front right wheel 102FR according to the above-mentioned camber angle control, to cause the protruding front right wheel 102FR to absorb shock or impact.

The above-mentioned camber angle control, rear-wheel toe control, and front-wheel steering control may prevent the vehicle 100 from being pushed to the left or forced to the left, and may control the vehicle 100 to travel straight or linearly, resulting in prevention of lane departure of the vehicle 100. Through the above-mentioned control, the controller 602 may minimize the influence of actual collision, while simultaneously ensuring driving stability.

FIG. 12 is a view illustrating a method for controlling vehicle wheels under a high possibility of collision in a center part of a right side of the vehicle, as shown in #3 of FIG. 9. Referring to FIG. 12, when there is a high possibility of collision in the center part of the right side of the vehicle 100, the controller 602 may be configured to perform the following wheel control. In particular, the controller 602 may be configured to perform camber angle control for front wheels (102FL, 102FR) and rear wheels (102RL, 102RR). The controller 602 may be configured to perform negative (−) camber control for the front left wheel 102FL and positive (+) camber control for the front right wheel 1021R. The controller 602 may not perform toe control for rear wheels 102RL and 102RR. That is, the controller 602 may not execute any toe drive portion angle adjustment. However, the controller 602 may be configured to adjust two rear wheels 102RL and 102RR to be arranged linearly, and may not perform toe-in or toe-out control for the rear wheels 102RL and 102RR. The controller 602 may be configured to adjust the front wheels 102FL and 102FR to be arranged linearly.

During actual collision in the center part (#3) of the right side of the vehicle 100, the vehicle 100 may be pushed to the left by external force applied to the center part of the right side thereof, resulting in lane departure of the vehicle 100. When there is a high possibility of collision in the center part (#3) of the right side of the vehicle 100, the controller 602 may allow the object to contact the protruding front-right and rear-right wheels 102FR and 102RR according to the above-mentioned camber angle control, to cause the protruding front-right and rear-right wheels 102FR and 102RR to absorb shock or impact. The above-mentioned camber angle control, rear-wheel toe control, and front-wheel steering control may prevent the vehicle 100 from being pushed to the left, and may control the vehicle 100 to travel straight, resulting in prevention of lane departure of the vehicle 100. Through the above-mentioned control, the controller 602 may minimize the influence of actual collision, while simultaneously ensuring driving stability.

FIG. 13 is a view illustrating a method for controlling vehicle wheels under a high possibility of collision in a rear part of a right side of the vehicle, as shown in #4 of FIG. 9.

Referring to FIG. 13, when there is a high possibility of collision in the rear part of the right side of the vehicle 100, the controller 602 may perform the following wheel control. In particular, the controller 602 may be configured to perform camber angle control for only rear wheels 102FR and 102RR. The controller 602 may be configured to perform positive (+) camber control for the rear left wheel 102RL and negative (−) camber control for the rear right wheel 102RR. Further, the controller 602 may be configured to perform toe control for rear wheels 102RL and 102RR. In particular, the controller 602 may be configured to perform toe-in control for the rear left wheel 102RL, and toe-out control for the rear right wheel 102RR. The controller 602 may also be configured to perform left steering control for the front wheels 102FL and 102FR.

During actual collision in the rear part (#4) of the right side of the vehicle 100, the vehicle 100 may lose linear traveling characteristics due to external force applied to the rear part of the right side of the vehicle 100 thus causing the vehicle 100 to be pushed to the left or the vehicle may be forced to the right, resulting in lane departure of the vehicle 100. When there is a high possibility of collision in the rear part (#4) of the right side of the vehicle 100, the controller 602 may allow the object to contact the protruding rear right wheel 102RR according to the above-mentioned camber angle control, to cause the protruding rear right wheel 102RR to absorb shock or impact. The above-mentioned camber angle control, rear-wheel toe control, and front-wheel steering control may prevent the vehicle 100 from being pushed to the left or forced to the right, and may control the vehicle 100 to travel straight, resulting in prevention of lane departure of the vehicle 100. Through the above-mentioned control, the controller 602 may minimize the influence of actual collision, while simultaneously ensuring driving stability.

Figure 14:
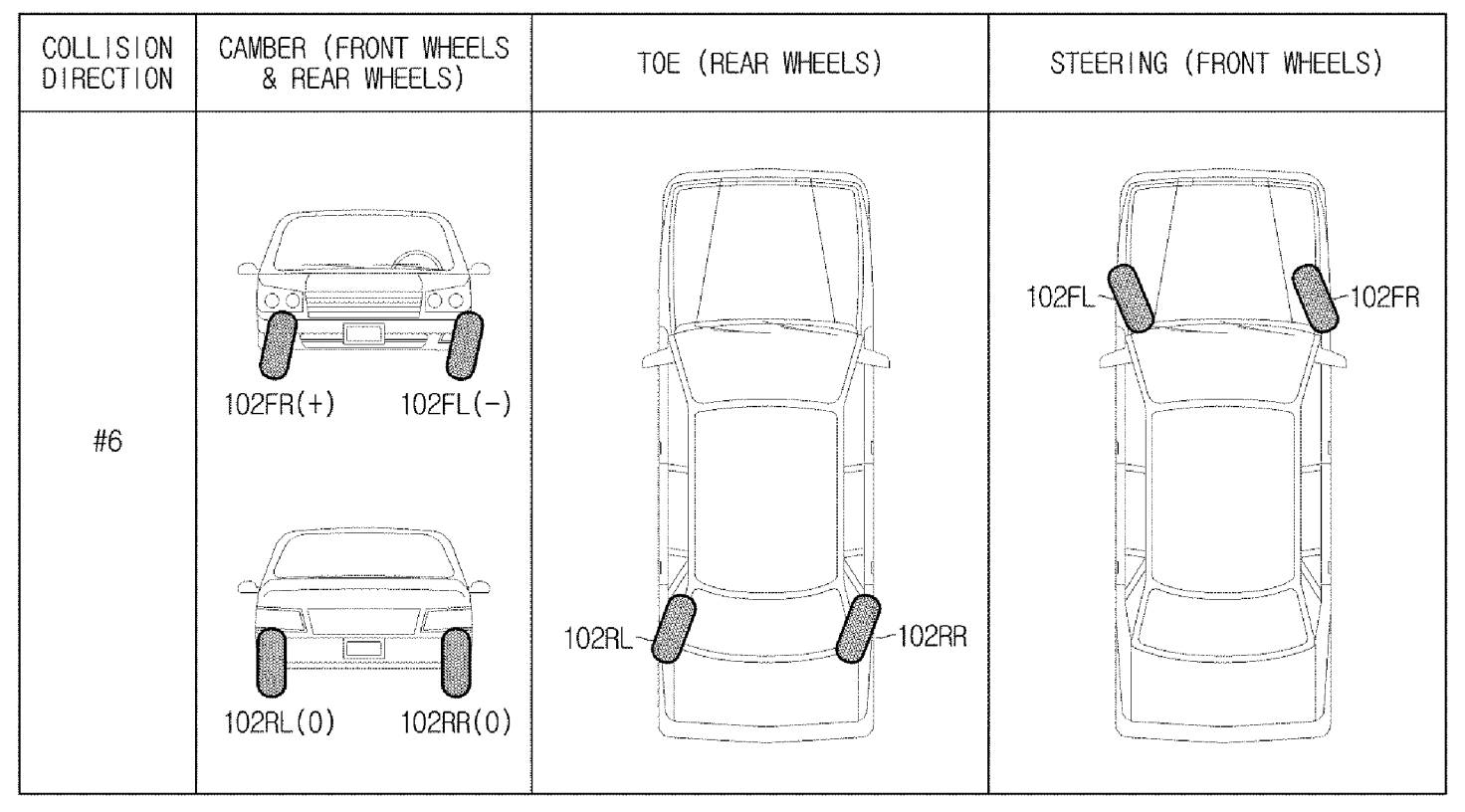

FIG. 14 is a view illustrating a method for controlling vehicle wheels under a high possibility of collision in a front part of a left side of the vehicle, as shown in #6 of FIG. 9. Referring to FIG. 14, when there is a high possibility of collision in the front part (#6) of the left side of the vehicle 100, the controller 602 may perform the following wheel control.

In particular, the controller 602 may be configured to perform camber angle control for only front wheels 102FL and 102FR. The controller 602 may be configured to perform positive (+) camber control for the front left wheel 102FL and negative (−) camber control for the front right wheel 102FR. The controller 602 may be configured to perform toe control for rear wheels 102RL and 102RR. Particularly, the controller 602 may be configured to perform toe-in control for the rear left wheel 102RL and toe-out control for the rear right wheel 102RR. The controller 602 may also be configured to perform left steering control for the front wheels 102FL and 102FR.

During actual collision in the front part (#6) of the left side of the vehicle 100, the vehicle 100 may lose linear traveling characteristics due to external force applied to the front part (#6) of the left side of the vehicle 100 thus causing the vehicle 100 to be pushed to the right or forced to the right, resulting in lane departure of the vehicle 100. When there is a high possibility of collision in the front part (#6) of the left side of the vehicle 100, the controller 602 may allow the object to contact the protruding front left wheel 102FL according to the above-mentioned camber angle control, to cause the protruding front left wheel 102FL to absorb shock or impact. The above-mentioned camber angle control, rear-wheel toe control, and front-wheel steering control may prevent the vehicle 100 from being pushed to the right or forced to the right, and may control the vehicle 100 to travel straight, resulting in lane departure of the vehicle 100. Through the above-mentioned control, the controller 602 may minimize the influence of actual collision, while simultaneously ensuring driving stability.

FIG. 15 is a view illustrating a method for controlling vehicle wheels under a high possibility of collision in a center part of a left side of the vehicle, as shown in #7 of FIG. 9. Referring to FIG. 15, when there is a high possibility of collision in the center part (#7) of the left side of the vehicle 100, the controller 602 may perform the following wheel control. In particular, the controller 602 may be configured to perform camber angle control for front wheels (102FL, 102FR) and rear wheels (102RL, 102RR). The controller 602 may be configured to perform positive (+) camber control for the front left wheel 102FL and negative (−) camber control for the front right wheel 1021R. The controller 602 may not perform toe control for rear wheels 102RL and 102RR. However, the controller 602 may be configured to adjust two wheels 102RL and 102RR to be arranged linearly, and while not performing toe-in or toe-out control. The controller 602 may also be configured to adjust the front wheels 102FL and 102FR to be arranged linearly.

During actual collision in the center part (#7) of the left side of the vehicle 100, the vehicle 100 may be pushed to the right due to external force applied to the center part (#7) of the left side of the vehicle 100, resulting in lane departure of the vehicle 100. When there is a high possibility of collision in the center part (#7) of the left side of the vehicle 100, the controller 602 may allow the object to contact the protruding front-left and rear-left wheels 102FL and 102RL according to the above-mentioned camber angle control, to cause the protruding front-left and rear-left wheels 102FL and 102RL to absorb shock or impact. The above-mentioned camber angle control, rear-wheel toe control, and front-wheel steering control may prevent the vehicle 100 from being pushed to the right, and may control the vehicle 100 to travel straight, resulting in prevention of lane departure of the vehicle 100. Through the above-mentioned control, the controller 602 may minimize the influence of actual collision, while simultaneously ensuring driving stability.

Figure 16:
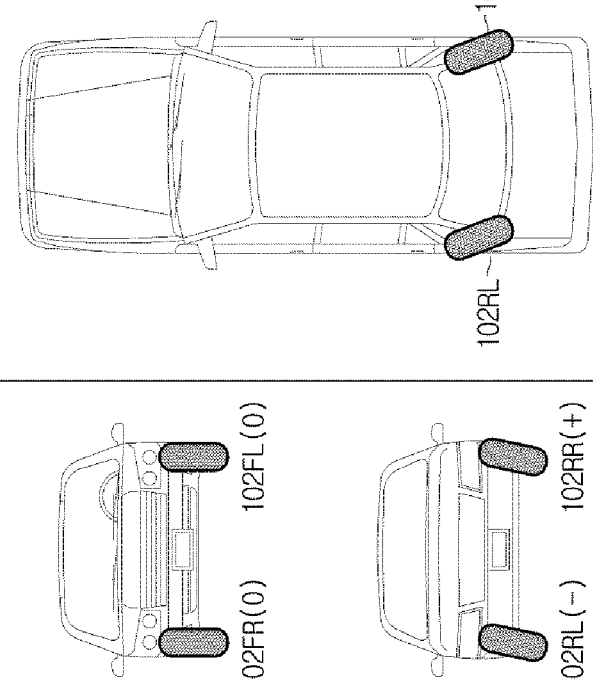
FIG. 16 is a view illustrating a method for controlling vehicle wheels under a high possibility of collision in a rear part of a left side of the vehicle according to an exemplary embodiment of the present disclosure.

FIG. 16 is a view illustrating a method for controlling vehicle wheels under a high possibility of collision in a rear part of a left side of the vehicle, as shown in #8 of FIG. 9. Referring to FIG. 16, when there is a high possibility of collision in the rear part (#8) of the left side of the vehicle 100, the controller 602 may perform the following wheel control. In particular, the controller 602 may be configured to perform camber angle control for only rear wheels 102FR and 102RR. The controller 602 may be configured to perform negative (−) camber control for the rear left wheel 102RL and positive (+) camber control for the rear right wheel 102RR. The controller 602 may further be configured to perform toe control for rear wheels 102RL and 102RR. Particularly, the controller 602 may be configured to perform toe-out control for the rear left wheel 102RL and toe-in control for the rear right wheel 102RR. The controller 602 may also be configured to execute right steering control for the front wheels 102FL and 102FR.

During actual collision in the rear part (#8) of the left side of the vehicle 100, the vehicle 100 may lose linear traveling characteristics due to external force applied to the rear part of the left side of the vehicle 100 thus causing the vehicle 100 to be pushed to the right or forced to the left, resulting in lane departure of the vehicle 100. When there is a high possibility of collision in the rear part (#8) of the left side of the vehicle 100, the controller 602 may allow the object to contact the protruding rear left wheel 102RL according to the above-mentioned camber angle control, to cause the protruding rear left wheel 102RL to absorb shock or impact. The above-mentioned camber angle control, rear-wheel toe control, and front-wheel steering control may prevent the vehicle 100 from being pushed to the right or mandatorily forced to the left, and may control the vehicle 100 to travel straight, resulting in prevention of lane departure of the vehicle 100. Through the above-mentioned control, the controller 602 may minimize the influence of actual collision, while simultaneously ensuring driving stability.

In FIGS. 11 to 16, the controller 602 may be configured to variably adjust the camber angle based on the collision estimation strength. When the collision estimation strength is substantially high (e.g., collision estimation index of 50% or greater), the camber angle of a first wheel 102 having a high possibility of collision may be adjusted at a first maximum camber angle, the camber angle of a second wheel 102 disposed at a diagonal position from the first wheel 102 may be adjusted at a second maximum camber angle opposite to the first maximum camber angle, to thus maximize the camber angle control effect. In contrast, when the collision estimation strength is substantially low (e.g., collision estimation index of less than 50%), the camber angle of a first wheel 102 having a high possibility of collision may be adjusted at a first maximum camber angle, the camber angle of a second wheel 102 disposed at a diagonal position from the first wheel 102 may be adjusted at an appropriate angle between about 0° (indicating straight arrangement) and a second maximum camber angle opposite to the first maximum camber angle, thus maintaining the ride quality of the vehicle.

As is apparent from the above description, the exemplary embodiment of the present disclosure may adjust and control vehicle wheels based on the possibility of collision between a host vehicle and a peripheral object, and may thus minimize the influence of such collision while simultaneously ensuring vehicle driving safety, resulting in increased safety of a driver and passenger within the vehicle, as well as increased driving safety of the vehicle.

Although a few exemplary embodiments of the present disclosure have been shown and described, it would be appreciated by those skilled in the art that changes may be made in these exemplary embodiments without departing from the principles and spirit of the invention, the scope of which is defined in the claims and their equivalents.

What is claimed is:

1. A method for controlling a vehicle, comprising:
   estimating, by a controller, whether there is a high possibility of collision between a vehicle and an object located in a peripheral region of the vehicle;
   when the high possibility of collision between the vehicle and the object is estimated, adjusting, by the controller, at least one of a camber angle and a toe angle, and steering of each of a plurality of wheels of the vehicle based on a situation of the estimated collision to ensure driving stability of the vehicle; and
   adjusting the camber angle to allow the object to contact a protruding portion of the plurality of wheels, to cause the protruding portion of the plurality of wheels to absorb shock or impact.

2. The method according to claim 1, wherein the estimating of the possibility of collision between the vehicle and the object includes:

performing, by the controller, the collision estimation using at least one of a relative speed and a relative distance between the vehicle and the object.

3. The method according to claim 2, further comprising:
estimating, by the controller, the possibility of collision between the vehicle and the object based on a higher value from among a collision estimation index calculated based on the relative speed and a collision estimation index calculated using the relative distance.

4. The method according to claim 1, wherein the situation of the estimated collision indicates a collision estimation direction in which the object would collide with the vehicle.

5. The method according to claim 4, wherein the estimated collision situation further includes collision estimation strength at which the object would collide with the vehicle.

6. The method according to claim 1, wherein a camber control of each of the plurality of wheels includes:
variably adjusting, by the controller, a camber angle of each wheel based on direction and a speed of the object.

7. The method according to claim 1, wherein ensuring the driving stability includes:
preventing, by the controller, lane departure of the vehicle and maintaining linear traveling characteristics of the vehicle.

8. A vehicle, comprising:
a sensor configured to detect an object located in a peripheral region of the vehicle; and a controller configured to:
estimate whether there is a high possibility of collision between the vehicle and the detected object based on a detection result of the sensor; and
when the high possibility of collision between the vehicle and the object is estimated, adjust at least one of camber angle, toe angle, and steering of each of a plurality of wheels of the vehicle based on a situation of the estimated collision to ensure driving stability of the vehicle, and
adjust the camber angle to allow the object to contact a protruding portion of the plurality of wheel, to cause the protruding portion of the plurality of wheels to absorb shock or impact.

9. The vehicle according to claim 8, wherein the estimation of collision between the vehicle and the object is executed using at least one of a relative speed and a relative distance between the vehicle and the object.

10. The vehicle according to claim 9, wherein the controller is configured to estimate the possibility of collision between the vehicle and the object based on a higher value from among a collision estimation index calculated based on the relative speed and a collision estimation index calculated using the relative distance.

11. The vehicle according to claim 8, wherein the estimated collision situation indicates a collision estimation direction in which the object would collide with the vehicle.

12. The vehicle according to claim 11, wherein the estimated collision situation further includes collision estimation strength at which the object would collide with the vehicle.

13. The vehicle according to claim 8, wherein the controller is configured to execute a camber control of each of the plurality of wheels by variably adjusting a camber angle of each wheel based on a direction and a speed of the object.

14. The vehicle according to claim 8, wherein the controller is configured to ensure the driving stability includes by preventing lane departure of the vehicle and maintaining linear traveling characteristics of the vehicle.

15. A method for controlling a vehicle, comprising:
detecting, by a controller, a relative speed and a relative distance between the vehicle and an object located in a peripheral region of the vehicle;
estimating, by the controller, whether there is a high possibility of collision between the vehicle and the object based on the detection result;
when the high possibility of collision between the vehicle and the object is estimated, adjusting, by the controller, at least one of a camber angle and a toe angle, and steering of each of a plurality of wheels of the vehicle based on a direction of the estimated collision and strength of the estimated collision to ensure driving stability of the vehicle; and
adjusting the camber angle to allow the object to contact a protruding portion of the plurality of wheels, to cause the protruding portion of the plurality of wheels to absorb shock or impact.

* * * * *